United States Patent
Hayashi et al.

(10) Patent No.: US 12,285,864 B2
(45) Date of Patent: Apr. 29, 2025

(54) LINK ACTUATION DEVICE AND METHOD FOR DRIVING LINK ACTUATION DEVICE

(71) Applicants: KYUSHU INSTITUTE OF TECHNOLOGY, Kitakyushu (JP); NTN Corporation, Osaka (JP)

(72) Inventors: Akihiro Hayashi, Iizuka (JP); Hirofumi Fukumaru, Iizuka (JP); Toshiki Takaki, Iwata (JP)

(73) Assignees: KYUSHU INSTITUTE OF TECHNOLOGY, Kitakyushu (JP); NTN Corporation, Osaka (JP)

( * ) Notice: Subject to any disclaimer, the term of this patent is extended or adjusted under 35 U.S.C. 154(b) by 252 days.

(21) Appl. No.: 18/181,291

(22) Filed: Mar. 9, 2023

(65) Prior Publication Data
US 2023/0286138 A1    Sep. 14, 2023

(30) Foreign Application Priority Data
Mar. 11, 2022   (JP) ................................. 2022-038289

(51) Int. Cl.
G06F 17/18 (2006.01)
B25J 9/00 (2006.01)
B25J 9/16 (2006.01)

(52) U.S. Cl.
CPC ........... B25J 9/1605 (2013.01); B25J 9/0048 (2013.01); G06F 17/18 (2013.01)

(58) Field of Classification Search
CPC ...... B25J 9/0048; B25J 9/1605; B25J 9/1615; B25J 9/1623; G05B 2219/40267; G06F 17/18
See application file for complete search history.

(56) References Cited

U.S. PATENT DOCUMENTS

2016/0008977 A1* 1/2016 Nishio ................... B25J 9/06
                                                              700/262
2017/0014994 A1   1/2017 Isobe et al.

FOREIGN PATENT DOCUMENTS

JP    S60-205713 A    10/1985
JP    2015-194207 A   11/2015

* cited by examiner

Primary Examiner — Dale Moyer
(74) Attorney, Agent, or Firm — Rimon P.C.

(57) ABSTRACT

A link actuation device includes a proximal link hub, a distal link hub, link mechanisms that couple the link hubs, an actuator, and a control device. The actuator includes motors provided for link mechanisms, respectively. The control device stores a map in which drive command values for each of the motors corresponding to a plurality of discrete positions within a movable range of the distal link hub are stored. Upon receipt of a command value for movement to a position that coincides with none of the plurality of positions within the movable range, the control device determines a drive command value for each of the motors by interpolating a region surrounded by four points at the plurality of positions on the map using a polynomial curved surface formula.

4 Claims, 11 Drawing Sheets

$$S(t) = \sum_{i=0}^{3} P_i B_i^3(t)$$

$$B_i^n(t) = \binom{n}{i} t^i (1-t)^{n-i} \quad (0 \le t \le 1)$$

$$\begin{cases} P_0 - P_4 : P_4 - P_1 = t : (1-t) \\ P_1 - P_5 : P_5 - P_2 = t : (1-t) \\ P_2 - P_6 : P_6 - P_3 = t : (1-t) \\ P_4 - P_7 : P_7 - P_5 = t : (1-t) \\ P_5 - P_8 : P_8 - P_6 = t : (1-t) \\ P_7 - P_9 : P_9 - P_8 = t : (1-t) \end{cases}$$

$$S(u, v) = \sum_{i=0}^{3} \sum_{j=0}^{3} P_{ij} B_i^3(u) B_j^3(v)$$

$$B_i^n(u) = \binom{n}{i} u^i (1-u)^{n-i} \quad (0 \le u \le 1)$$

$$B_j^n(v) = \binom{n}{j} v^j (1-v)^{n-j} \quad (0 \le v \le 1)$$

$$\begin{cases} S_{10} = \sum_{i=0}^{3}\sum_{j=0}^{3} P_{ij}B_i\left(\frac{1}{3}\right)B_j(0) \\ S_{20} = \sum_{i=0}^{3}\sum_{j=0}^{3} P_{ij}B_i\left(\frac{2}{3}\right)B_j(0) \\ \quad\vdots \\ S_{23} = \sum_{i=0}^{3}\sum_{j=0}^{3} P_{ij}B_i\left(\frac{2}{3}\right)B_j(1) \end{cases}$$

LINK ACTUATION DEVICE AND METHOD FOR DRIVING LINK ACTUATION DEVICE

BACKGROUND

Technical Field

The present disclosure relates to a link actuation device and a method for driving a link actuation device, and more specifically, to a technique for improving positioning accuracy of a link actuation device.

Description of the Background Art

A link actuation device is used in medical equipment, industrial equipment, and the like that require a precise and wide operation range. The link actuation device includes a drive source and a link mechanism. A parallel link mechanism is known as a kind of link mechanism. For example, a link actuation device as disclosed in Japanese Patent Laying-Open No. 2015-194207 has been proposed as a link actuation device capable of operating in a precise and wide operation range even with a compact configuration. Such a link actuation device is attached to a distal end of an arm of an industrial robot to be used as a wrist joint mechanism that controls a position and an attitude of an end effector, for example.

SUMMARY

In order to drive the link actuation device, it is necessary to calculate, by inverse transformation, a drive command value for driving each link from an input target position. The link actuation device, however, has a complicated configuration including a combination of a plurality of link mechanisms, so that, on an actual machine basis, a positioning error depending on the way of movement of a machine may occur for each machine due to an influence of a manufacturing error, an assembly error, deflection of a link mechanism unique to the actual machine, or the like. Therefore, there is a possibility that desired positioning accuracy cannot be achieved with a drive command value derived by a theoretical inverse kinematic function.

Japanese Patent Laying-Open No. S60-205713 discloses a method for an industrial robot, measuring and storing a correction amount of an error at each positioning point in advance as a three-dimensional map, and correcting a positioning error with respect to an input target position with reference to the three-dimensional map.

With the three-dimensional map used in Japanese Patent Laying-Open No. S60-205713, it is, however, practically impossible to set the correction amounts for all the positions in a space, and the three-dimensional map is defined as a set of discrete points. Therefore, when a position that is not stored as the three-dimensional map is designated as the target position, there is a possibility that appropriate positioning correction cannot be performed. On the other hand, when the number of measurement points for generating the three-dimensional map is increased and the correction amounts for a larger number of target points are set, an enormous amount of time is required to set the correction amounts and a large burden is imposed on an operator who makes adjustments. Further, an enormous amount of data is required for positioning correction, and a storage device having a large storage capacity is required.

The present disclosure has been made to solve such problems, and it is therefore an object of the present disclosure to improve positioning accuracy while suppressing an increase in amount of data of a map for positioning correction and an increase in burden at the time of adjustment in a link actuation device including a parallel link mechanism.

A link actuation device according to a first aspect of the present disclosure includes a first link hub adjacent to a proximal end, a second link hub adjacent to a distal end, at least three link mechanisms that couple the first link hub and the second link hub, a drive device that drives the at least three link mechanisms, and a control device that controls the drive device. The drive device includes motors provided for the at least three link mechanisms, respectively. Each of the at least three link mechanisms includes a first end link member rotatably coupled to the first link hub, a second end link member rotatably coupled to the second link hub, and a center link member rotatably coupled to both the first end link member and the second end link member. In the at least three link mechanisms, at least three center axes of revolute pairs of the first link hub and the first end link members and a center axis of a revolute pair of one end of each of the center link members intersect at a first link hub center point, and at least three center axes of revolute pairs of the second link hub and the second end link members and a center axis of a revolute pair of the other end of each of the center link members intersect at a second link hub center point. The control device stores a map in which drive command values for each of the motors corresponding to a plurality of discrete positions within a movable range of the second link hub are stored. Upon receipt of a command value for movement to a position that coincides with none of the plurality of positions within the movable range, the control device determines a drive command value for each of the motors by interpolating a region surrounded by four points at the plurality of positions on the map using a polynomial curved surface formula.

A method according to a second aspect of the present disclosure relates to a method for driving a link actuation device. The link actuation device includes a first link hub adjacent to a proximal end, a second link hub adjacent to a distal end, at least three link mechanisms that couple the first link hub and the second link hub, and a drive device that drives the at least three link mechanisms. The drive device includes motors provided for the at least three link mechanisms, respectively. Each of the at least three link mechanisms includes a first end link member rotatably coupled to the first link hub, a second end link member rotatably coupled to the second link hub, and a center link member rotatably coupled to both the first end link member and the second end link member. In the at least three link mechanisms, at least three center axes of revolute pairs of the first link hub and the first end link members and a center axis of a revolute pair of one end of each of the center link members intersect at a first link hub center point, and at least three center axes of revolute pairs of the second link hub and the second end link members and a center axis of a revolute pair of the other end of each of the center link members intersect at a second link hub center point. The above-described method includes (1) generating and storing a map in which drive command values for each of the motors corresponding to a plurality of discrete positions within a movable range of the second link hub are stored, (2) receiving a target movement position of the second link hub, (3) interpolating a region surrounded by four points at the plurality of positions on the map using a polynomial curved surface formula in a case where the target movement position coincides with none of the plurality of positions within the movable range, (4) determining a drive command value for each of the motors using the map subjected to the interpolation, and (5) driving each of the motors using the command value determined for each of the motors.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
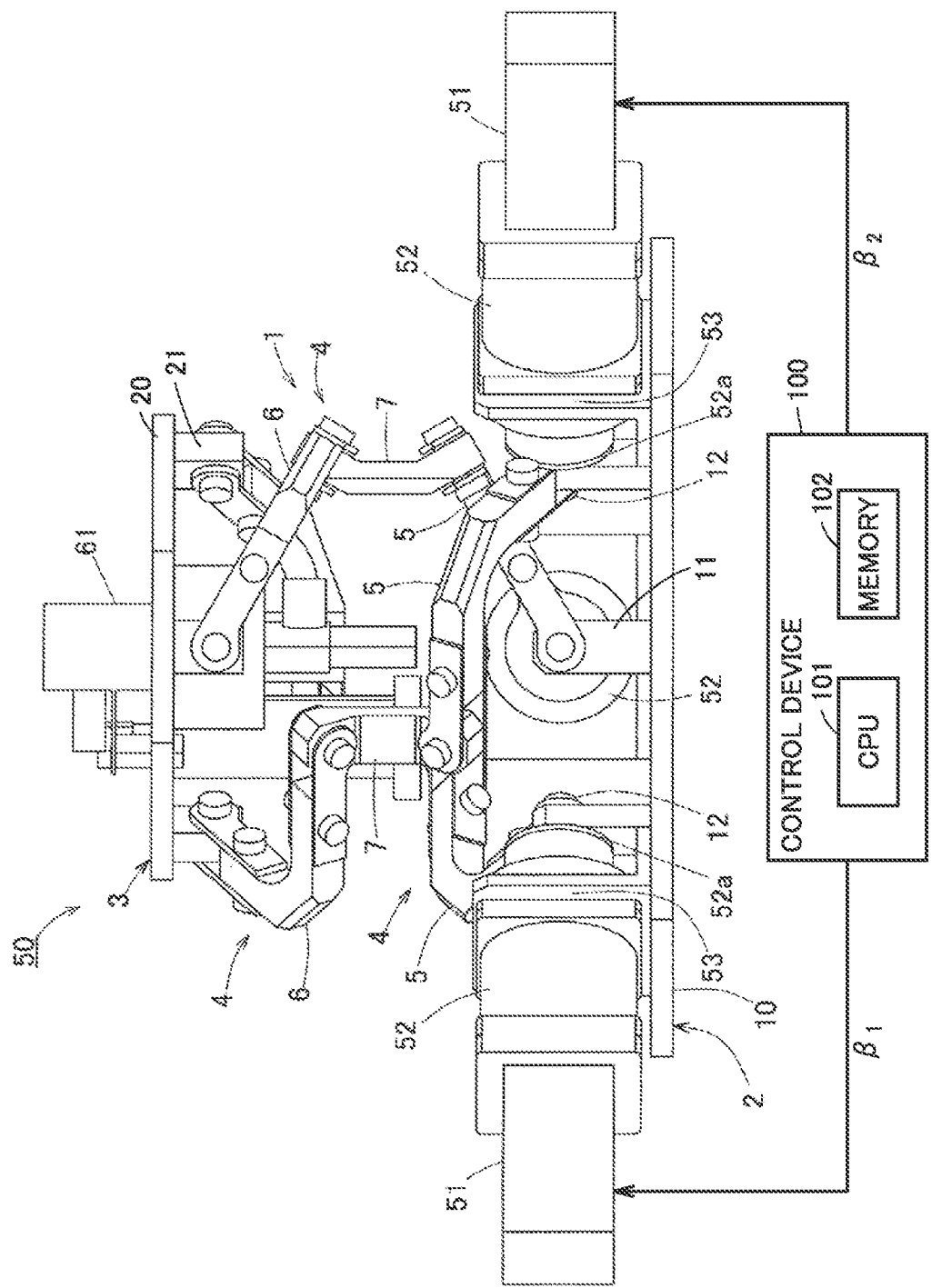
FIG. 1 is a front view of a link actuation device in a certain position.

Hereinafter, an embodiment of the present disclosure will be described in detail with reference to the drawings. Note that, in the following drawings, the same or corresponding parts are denoted by the same reference numerals, and no redundant description will be given of such parts.
[Configuration of Link Actuation Device]

A configuration of a link actuation device 50 including a parallel link mechanism 1 according to an embodiment of the present disclosure will be described with reference to FIGS. 1 to 3.

FIG. 1 is a front view of link actuation device 50 in a certain position. With reference to FIG. 1, link actuation device 50 includes parallel link mechanism 1, an actuator 51 for changing the position of parallel link mechanism 1, a speed reduction mechanism 52 that reduces a driving force of the actuator and transmits the reduced driving force to parallel link mechanism, and a control device 100 that controls actuator 51.

Parallel link mechanism 1 includes a proximal link hub 2, a distal link hub 3, and three link mechanisms 4, link hub 3 and link hub 2 being coupled via three link mechanisms 4 so as to be changeable in position. Note that the number of link mechanisms 4 may be four or more. An end effector 61 is installed on distal link hub 3.

Control device 100 includes a central processing unit (CPU) 101 and a memory 102. CPU 101 executes a program stored in memory 102 to control the position of parallel link mechanism 1. More specifically, control device 100 calculates a rotation angle $\beta$ of each link mechanism 4 for implementing a target position command (bending angle $\theta$, turning angle $\varphi$) that is transmitted from the outside to set the position of parallel link mechanism 1, and controls actuator 51 so as to achieve rotation angle $\beta$.

Figure 2:
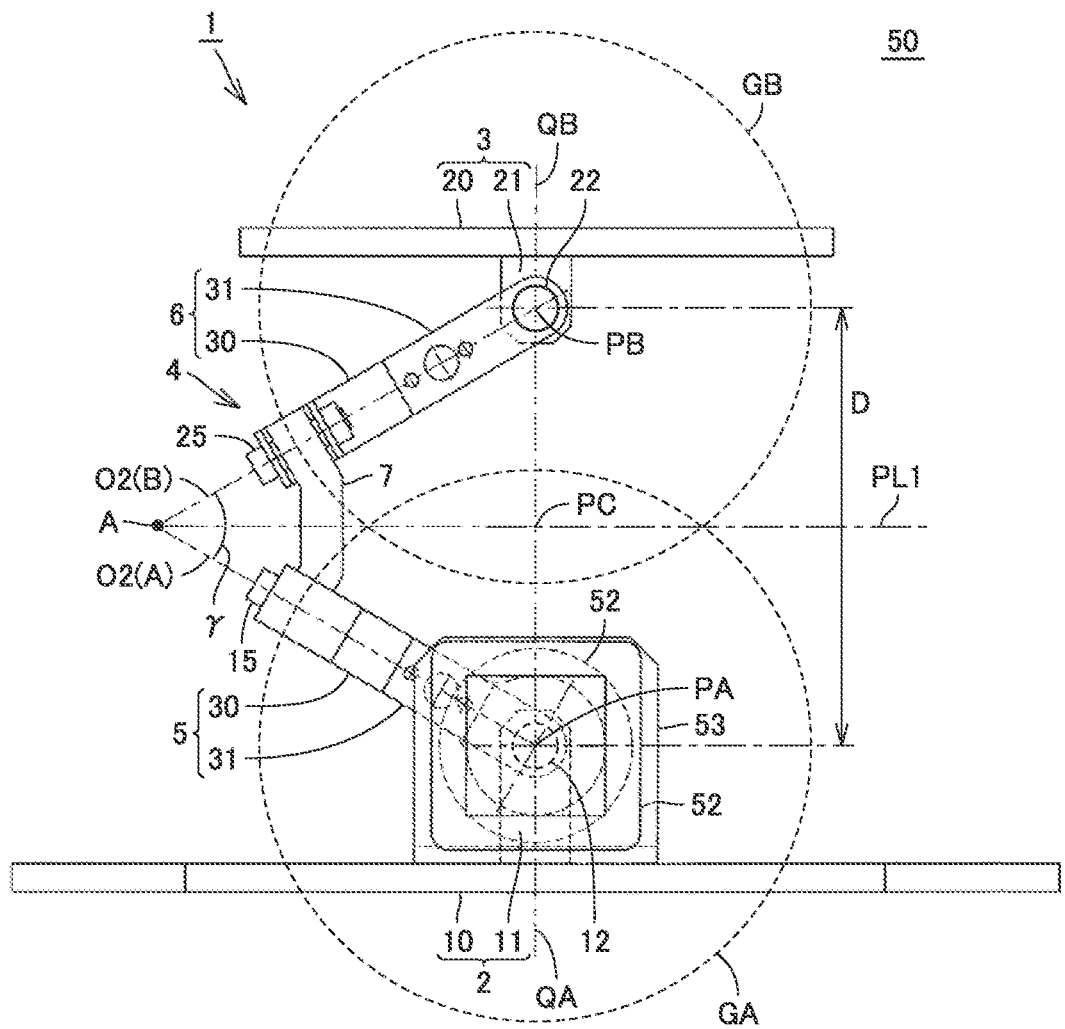
FIG. 2 is a diagram representatively illustrating components corresponding to one link mechanism among components of the link actuation device.

FIG. 2 is a diagram representatively illustrating components corresponding to one link mechanism 4 among the components of link actuation device 50. With reference to FIG. 2, each link mechanism 4 includes a proximal end link member 5, a distal end link member 6, and a center link member 7 to form a four-node chain link mechanism including four revolute pairs. Proximal end link member 5 has one end rotatably coupled to proximal link hub 2. Similarly, distal end link member 6 has one end rotatably coupled to distal link hub 3. Proximal end link member 5 has the other end rotatably coupled to one end of center link member 7. Distal end link member 6 has the other end rotatably coupled to the other end of center link member 7.

As illustrated in FIGS. 1 and 2, proximal link hub 2 includes a base 10 having a flat shape and three rotary shaft coupling members 11 arranged at equal intervals in a circumferential direction on base 10. To each rotary shaft coupling member 11, a rotary shaft 12 having a shaft center intersecting a center axis QA of link hub 2 is rotatably coupled. Proximal end link member 5 has one end coupled to rotary shaft 12. Proximal end link member 5 has the other end coupled to a rotary shaft 15 that is rotatably coupled to one end of center link member 7. According to the present embodiment, rotary shaft coupling members 11 are arranged at equal intervals in the circumferential direction on base 10, but need not be arranged in this manner.

A rotary shaft 22 of link hub 3 and a rotary shaft 25 of center link member 7 are also identical in shape to rotary shafts 12, 15.

As illustrated in FIGS. 1 and 2, distal link hub 3 includes a distal end member 20 having a flat shape and three rotary shaft coupling members 21 arranged at equal intervals in the circumferential direction on distal end member 20. To each rotary shaft coupling member 21, rotary shaft 22 having a shaft center intersecting a center axis QB of link hub 3 is rotatably coupled. Distal end link member 6 has one end coupled to rotary shaft 22 of link hub 3. Distal end link member 6 has the other end coupled to rotary shaft 25 that is rotatably coupled to the other end of center link member 7.

A center axis O2(A) of a revolute pair of end link member 5 and center link member 7 and a center axis O2(B) of a revolute pair of end link member 6 and center link member 7 intersect at a point A at an axial angle $\gamma$.

Figure 3:
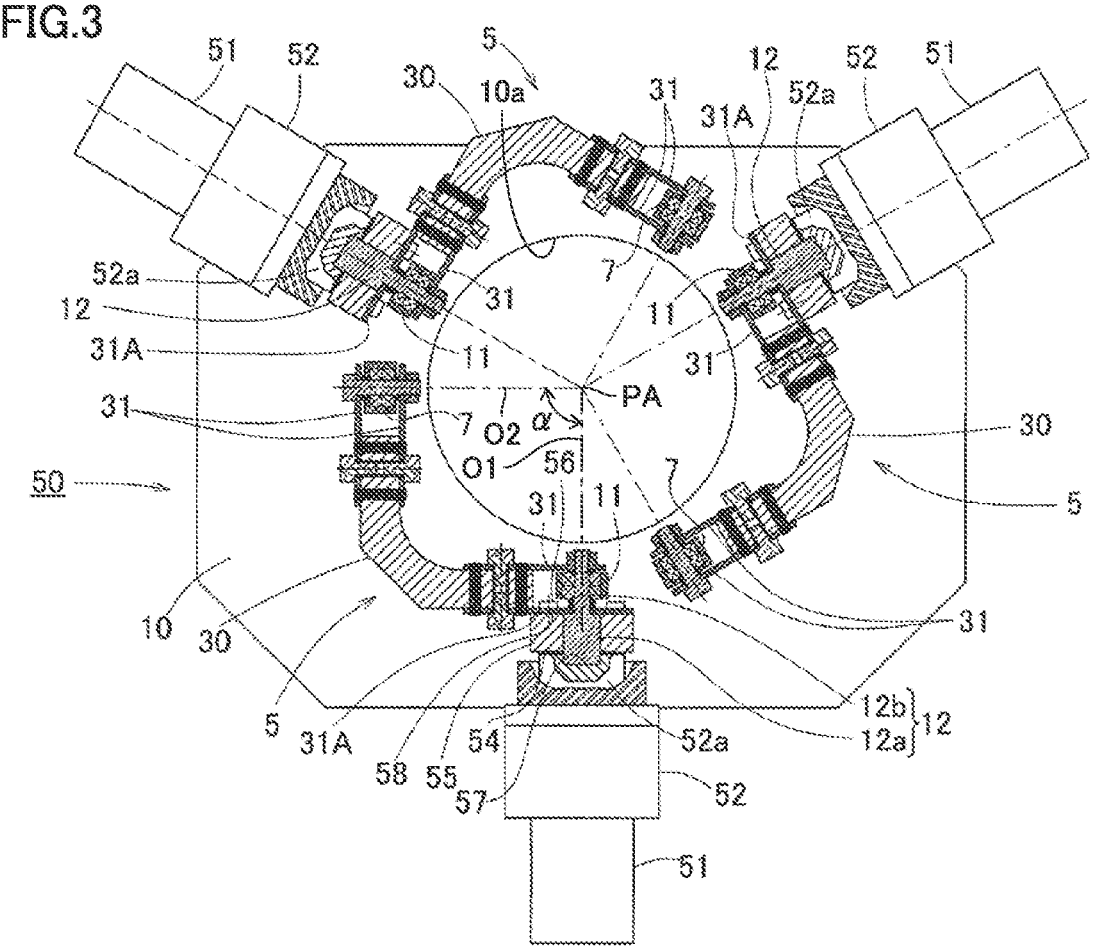
FIG. 3 is a cross-sectional view, in an extracted manner, of a proximal link hub and a proximal end link member of a parallel link mechanism.

FIG. 3 is a cross-sectional view, in an extracted manner, of proximal link hub 2 and proximal end link member 5 of the parallel link mechanism. FIG. 3 illustrates the parallel link mechanism in the position illustrated in FIG. 1 without distal link hub 3, distal end link member 6, and center link member 7. Note that a cross section of each of three end link members 5 taken along a plane including rotation axes O1, O2 of the revolute pairs at both ends of end link member 5 is illustrated.

With reference to FIGS. 1 and 3, three link mechanisms 4 are each provided with actuator 51 that arbitrarily changes the position and attitude of distal link hub 3 relative to proximal link hub 2. Each actuator 51 is provided with speed reduction mechanism 52. Each actuator 51 is a rotary actuator, and is installed on an upper surface of base 10 of proximal link hub 2 so as to be coaxial with a corresponding rotary shaft 12. Actuator 51 and speed reduction mechanism 52 are integrally provided, and speed reduction mechanism 52 is fixed to base 10 by a motor fixing member 53. Note that by providing each of at least two of three link mechanisms 4 with actuator 51, it is possible to determine the position and attitude of distal link hub 3 relative to proximal link hub 2.

In FIG. 3, speed reduction mechanism 52 includes an output shaft 52a that has a large diameter and serves as a flange coupling. A distal end surface of output shaft 52a is a planar flange surface 54 orthogonal to a center line of output shaft 52a. Output shaft 52a is connected, with a bolt 56, to a rotary shaft supporting member 31 on an outer diameter side of proximal end link member 5 with a spacer 55 interposed between output shaft 52a and rotary shaft supporting member 31. Rotary shaft 12 at the revolute pair of link hub 2 and end link member 5 includes a large diameter portion 12a and a small diameter portion 12b. Small diameter portion 12b is inserted into an inner ring of a bearing, and large diameter portion 12a is fitted to an inner diameter groove 57 provided in output shaft 52a of speed reduction mechanism 52.

End link member 5 has an L shape. End link member 5 includes one curved member 30 and a total of four rotary shaft supporting members 31 each fixed to a corresponding one of outer diameter side surfaces and inner diameter side surfaces of both ends of curved member 30. Four rotary shaft supporting members 31 are not identical in shape to each other. A rotary shaft supporting member 31A on the outer diameter side provided at the revolute pair with proximal link hub 2 has a flange attachment surface 58 coupled to flange surface 54 of speed reduction mechanism 52 with spacer 55 interposed between flange attachment surface 58 and flange surface 54. According to the present embodiment, end link member 5 has an L shape, but need not necessarily have an L shape.

In link actuation device 50, end effector 61 is installed on distal link hub 3 as illustrated in FIG. 1, for example. It is possible to control an angle of two degrees of freedom of end effector 61 by causing actuator 51 to change the position of distal link hub 3 relative to proximal link hub 2.

FIG. 3 illustrates a relation among center axis O1 of the revolute pair of proximal link hub 2 and proximal end link member 5, center axis O2 of the revolute pair of end link member 5 and center link member 7, and a link hub center point PA for three link mechanisms 4. As illustrated in FIG. 3, three center axes O1 that are rotation axes of three actuators 51, and link hub center point PA are on the same plane. As illustrated in FIG. 2, center axis O2 passes through link hub center point PA on this plane from obliquely above. Distal link hub 3 and distal end link member 6 are also identical in shape and positional relation (not illustrated) to the proximal end side illustrated in FIG. 3. In the example illustrated in FIG. 3, an angle α (arm angle) formed by center axis O1 and center axis O2 is 90°, but angle α may be other than 90°.

Parallel link mechanism 1 has a structure corresponding to a combination of two spherical link mechanisms.

Center axis O1 of the revolute pair of link hub 2 and end link member 5 and center axis O2 of the revolute pair of end link member 5 and center link member 7 intersect at proximal link hub center point PA (FIGS. 2 and 3). Further, on the proximal end side, a distance along axis O1 between link hub center point PA and the revolute pair of link hub 2 and end link member 5 is the same as a distance along axis O2 between link hub center point PA and the revolute pair of end link member 5 and center link member 7.

Although an illustration as in FIG. 3 is not given, similarly, the center axis of the revolute pair of link hub 3 and end link member 6 and center axis O2(B) of the revolute pair of end link member 6 and center link member 7 intersect at a distal link hub center point PB (FIG. 2). Further, on the distal end side, a distance between link hub center point PB and each revolute pair of link hub 3 and end link member 6 is the same as a distance between link hub center point PB and the revolute pair of end link member 6 and center link member 7.

Figure 4:
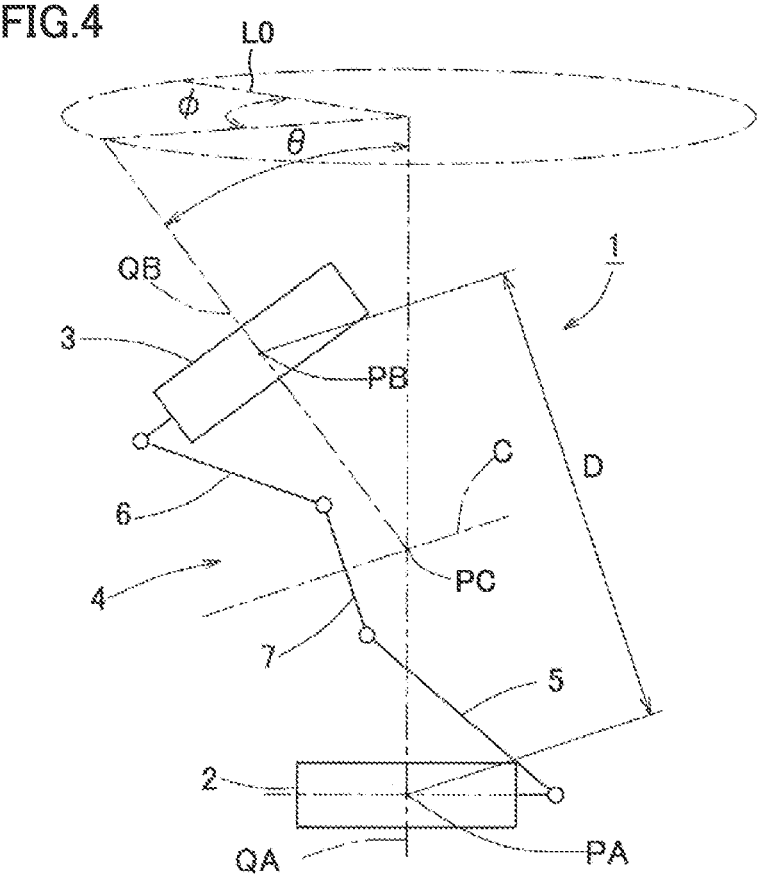
FIG. 4 is a diagram schematically illustrating one link mechanism extracted from three link mechanisms of the parallel link mechanism and represented by a straight line.

FIG. 4 is a schematic diagram illustrating one link mechanism 4 extracted from three link mechanisms 4 of parallel link mechanism 1 and represented by a straight line. Bending angle θ and turning angle γ will be described with reference to FIG. 4.

Three link mechanisms 4 have the geometrically same symmetrical shape. The geometrically same symmetrical shape means that, as illustrated in FIG. 4, a geometric model in which end link members 5, 6 and center link member 7 are represented by straight lines and the revolute pairs are represented by circles, has the proximal portion and the distal portion symmetrical with respect to a bisecting plane. Parallel link mechanism 1 according to the present embodiment is of a rotationally symmetrical type, and has a position configuration in which a positional relation between proximal link hub 2 and proximal end link member 5, and distal link hub 3 and distal end link member 6 is rotationally symmetrical with respect to a center line C (corresponding to PL1 in FIG. 2) of center link member 7.

Proximal link hub 2, distal link hub 3, and three link mechanisms 4 constitute a two-degree of freedom mechanism in which distal link hub 3 is rotatable about two orthogonal axes relative to proximal link hub 2. In other words, the two-degree of freedom mechanism is a mechanism capable of freely changing the position of distal link hub 3 relative to proximal link hub 2 with two degrees of freedom. This two-degree of freedom mechanism can make a movable range of distal link hub 3 relative to proximal link hub 2 large even with a compact configuration.

For example, a straight line passing through link hub center point PA and intersecting, at a right angle, center axis O1 (FIG. 3) of the revolute pair of link hub 2 and end link member 5 is defined as center axis QA of link hub 2. Further, a straight line passing through link hub center point PB and intersecting, at a right angle, the center axis (not illustrated) of the revolute pair of link hub 3 and end link member 6 is defined as a center axis QB of link hub 3.

In this case, a maximum value of bending angle θ (FIG. 4) between center axis QA of proximal link hub 2 and center axis QB of distal link hub 3 can be set at about ±90°. Further, turning angle φ (FIG. 4) of distal link hub 3 relative to proximal link hub 2 can be set in a range of 0° to 360°. Bending angle θ is an angle at which center axis QB is inclined from the center axis QA on a vertical plane including center axis QA and center axis QB. Turning angle φ is an angle formed by a projection straight line of center axis QB on a horizontal plane and a straight line L0 indicating a reference position of turning angle φ.

The position of distal link hub 3 relative to proximal link hub 2 is changed with an intersection point PC of center axis QA of link hub 2 and center axis QB of link hub 3 as a rotation center. Even when the position changes, a distance D (FIG. 4) between proximal link hub center point PA and distal link hub center point PB does not change.

In parallel link mechanism 1, the following conditions are satisfied. That is, in each link mechanism 4, an angle formed by center axis O1 and center axis O2 of the proximal end link member is equal to an angle formed by center axis O1 and center axis O2 of the distal end link member. Lengths from link hub center points PA, PB to the revolute pairs are equal to each other. A center axis O1(A) of the revolute pair of link hub 2 and end link member 5 of each link mechanism 4 intersects proximal link hub center point PA. Center axis O2(A) of the revolute pair of end link member 5 and center link member 7 of each link mechanism 4 intersects proximal link hub center point PA. A center axis O1(B) of the revolute pair of link hub 3 and end link member 6 of each link mechanism 4 intersects distal link hub center point PB. Center axis O2(B) of the revolute pair of end link member 6 and center link member 7 of each link mechanism 4 intersects distal link hub center point PB. Proximal end link member 5 and distal end link member 6 are identical in geometric shape to each other, and the distal end and the proximal end of center link member 7 are also identical in shape to each other. With these conditions satisfied, if an angular positional relation between center link member 7 and end link members 5, 6 is the same between the proximal end side and the distal end side with respect to a symmetry plane of center link member 7, proximal link hub 2 and proximal end link member 5, and distal link hub 3 and distal end link member 6 move symmetrically with respect to the bisecting plane in terms of geometric symmetry.

Figure 5:
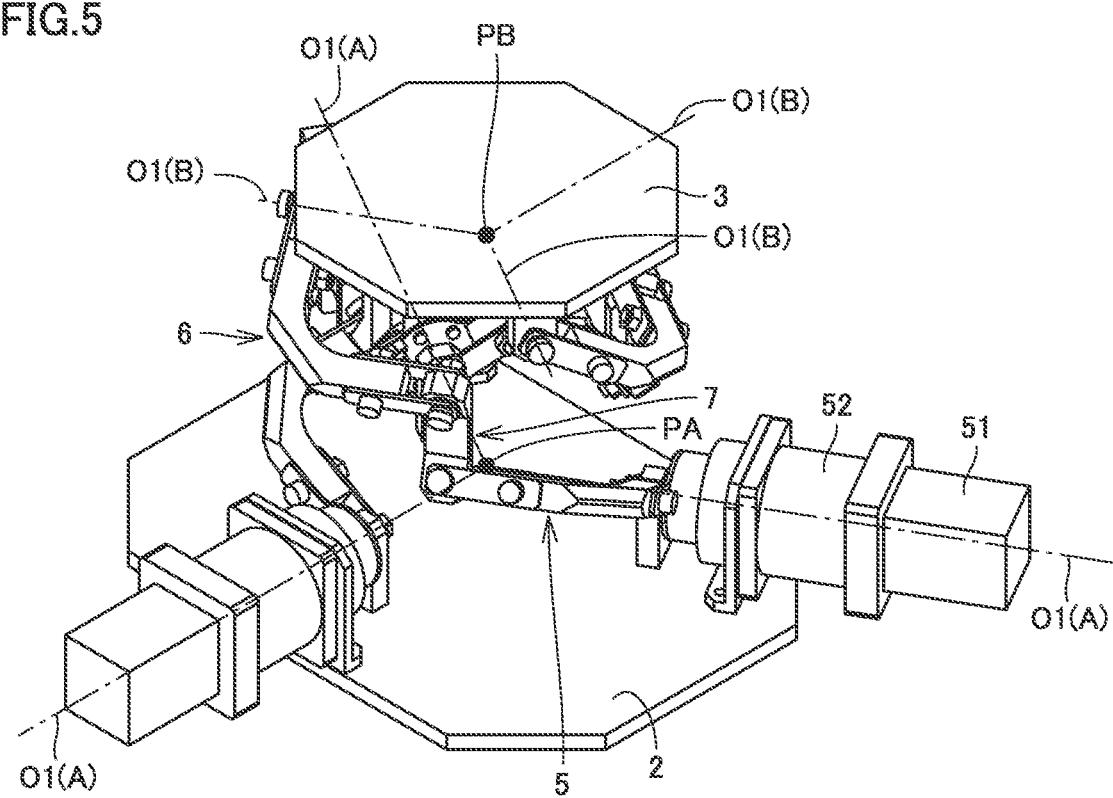
FIG. 5 is a perspective view of the link actuation device in a state (origin position) where a proximal link hub center axis and a distal link hub center axis coincide with each other.

FIG. 5 is a perspective view of the link actuation device in a state where proximal link hub center axis QA and distal link hub center axis QB are on the same line.

FIG. 5 illustrates the origin position of link actuation device 50. Herein, the origin position refers to a position in a state where center axis QA of proximal link hub 2 and center axis QB of distal link hub 3 coincide with each other. That is, the origin position is a position in which bending angle θ of link actuation device 50 is 0 degrees.

Figure 6:
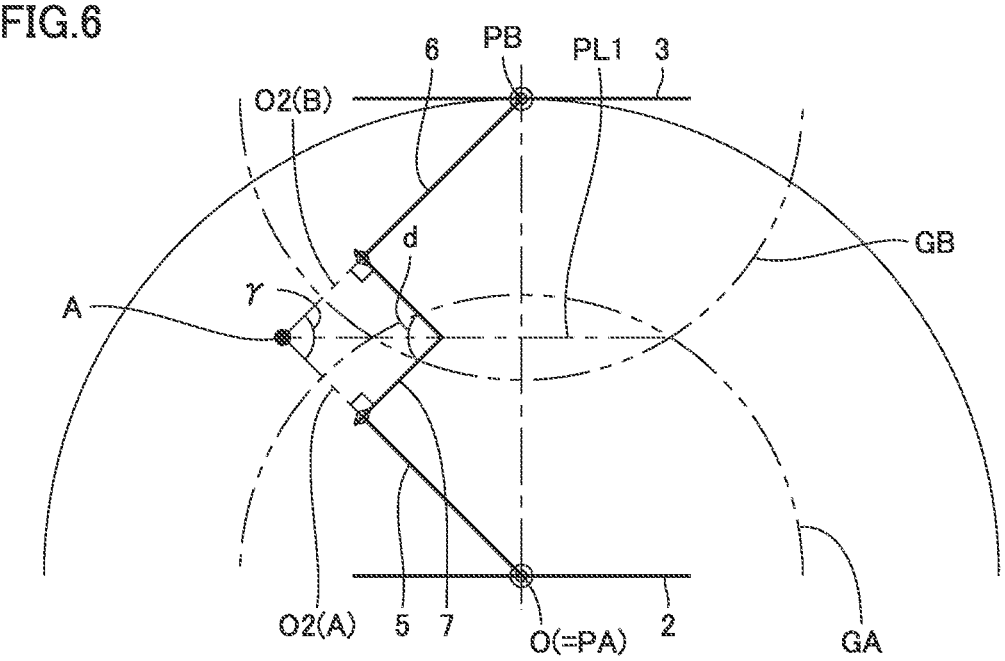
FIG. 6 is a schematic diagram of the link actuation device in the origin position.

FIG. 6 is a schematic diagram of the link actuation device in the origin position. FIG. 2 is a front view of only one of three sets of link mechanisms in the origin position illustrated in FIG. 1, and FIG. 6 is a model diagram obtained by simplifying FIG. 2. The link mechanism can be represented in a simplified manner by the proximal link hub and the distal link hub, the proximal end link member and the distal end link member, and the center link member.

Parallel link mechanism 1 of link actuation device 50 is mirror-symmetrical with respect to bisecting plane PL1 that is a plane formed by intersections of a proximal spherical link GA centered on proximal link hub center point PA and a distal spherical link GB centered on distal link hub center point PB. Point A where center axis O2(A) of the revolute pair of proximal end link member 5 and center link member 7 intersects center axis O2(B) of the revolute pair of distal end link member 6 and center link member 7 lies on bisecting plane PL1. Further, an angle formed by center axis O2(A) of the revolute pair of proximal end link member 5 and center link member 7, and center axis O2(B) of the revolute pair of distal end link member 6 and center link member 7 is referred to as axial angle γ. An angle formed by center link member 7 is referred to as a center angle d. To be exact, center angle d is an angle formed by an intersection, on the bisecting plane, of a straight line perpendicular to center axis O2(A) of the revolute pair of proximal end link member 5 and center link member 7, and a straight line perpendicular to center axis P2(B) of the revolute pair of distal end link member 6 and center link member 7. Axial angle γ and center angle d are constants determined when parallel link mechanism 1 is designed. Further, from FIG. 6, center angle d can be expressed by $d=\pi-\gamma$ (rad) using axial angle γ.

Figure 7:
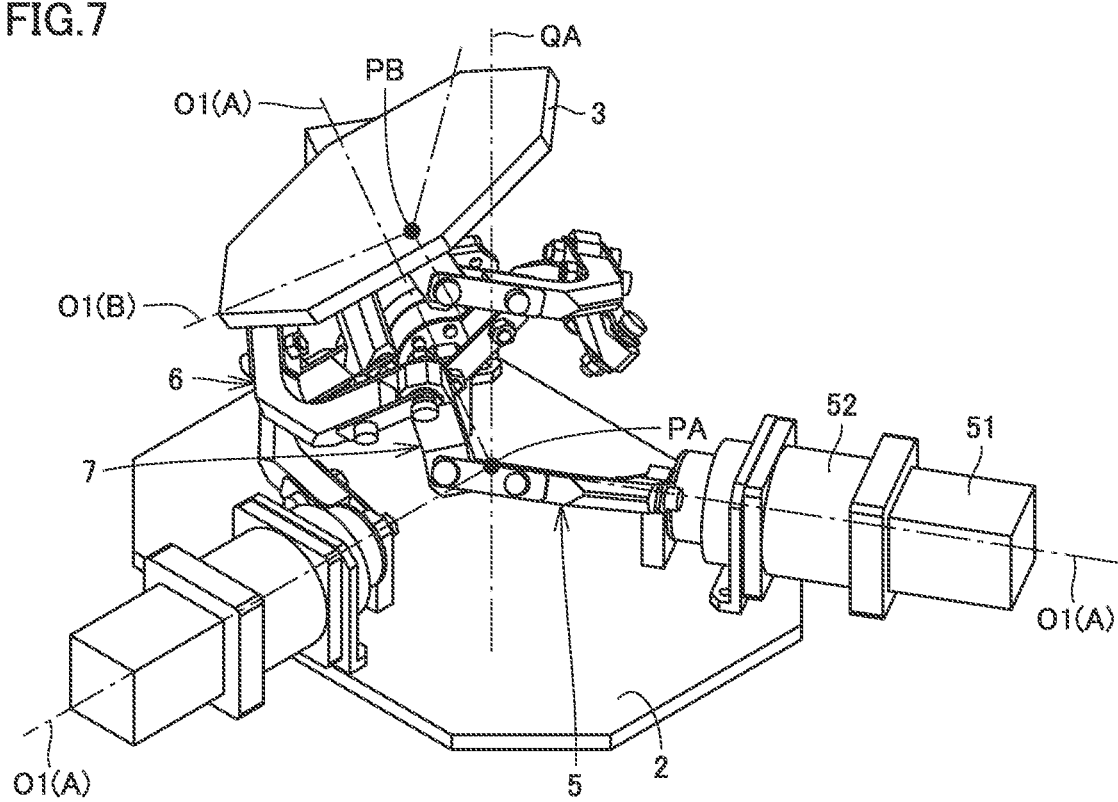
FIG. 7 is a perspective view of the link actuation device in any position (bending angle $\theta$, turning angle $\varphi$).
Figure 8:
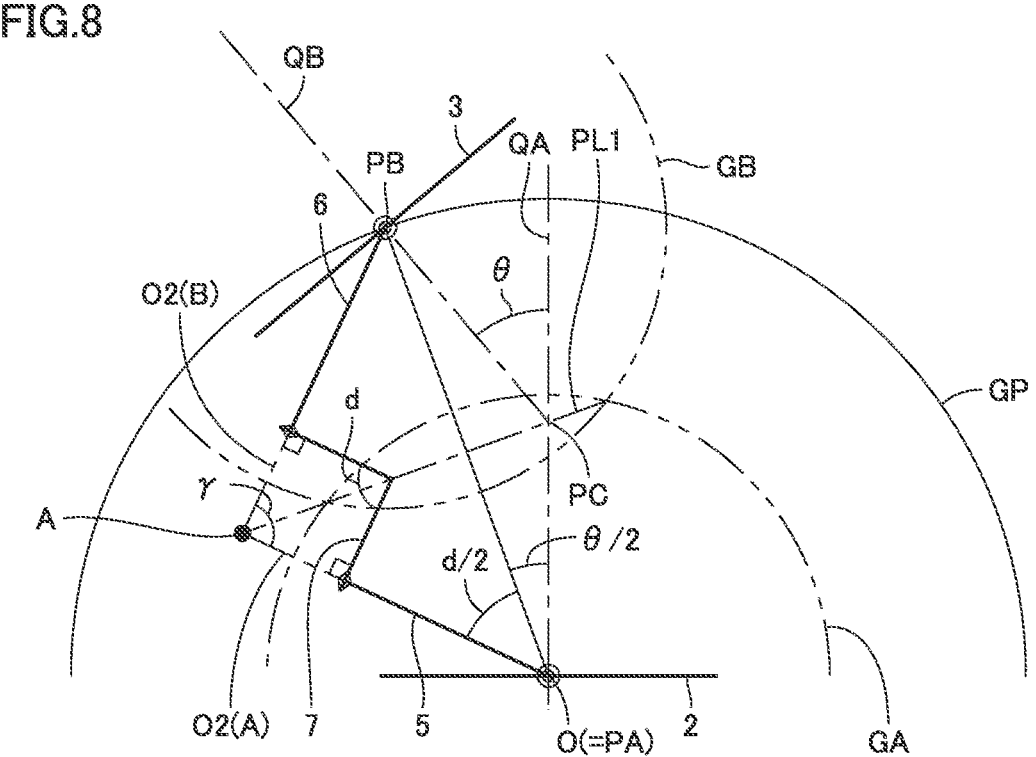
FIG. 8 is a model diagram of FIG. 7.

FIG. 7 is a perspective view of the link actuation device in any position (bending angle θ, turning angle φ). FIG. 8 is a model diagram of FIG. 7. In any position (bending angle θ, turning angle φ), distal link hub center axis QB forms a certain angle (bending angle θ) relative to proximal link hub center axis QA.

Point A always lies on bisecting plane PL1, and can be regarded as one two-degree of freedom joint. At bending angle θ, an angle formed by a straight line connecting proximal link hub center point PA and distal link hub center point PB, and center axis QA of proximal link hub 2 becomes θ/2. Further, an angle formed by the straight line connecting proximal link hub center point PA and distal link hub center point PB, and a straight line passing through proximal link hub center point PA and point A becomes d/2. Parallel link mechanism 1 is a mechanism that works while keeping such relations.

Since parallel link mechanism 1 has two degrees of freedom, the position of distal link hub 3 is determined if two arm rotation angles $\beta_1$, $\beta_2$ are determined. Center PB of distal link hub 3 of parallel link mechanism 1 moves on a spherical surface GP having a radius D (FIG. 4) with center PA of proximal link hub 2 as a center O in FIG. 8.

Although actual center PB and point A have been described above, the calculation can be simplified by projecting these points on a unit spherical surface and using a triangular model in the unit spherical surface.

[Description of Three-Dimensional Map]
(Real Space and Motor Space)

Figure 9:
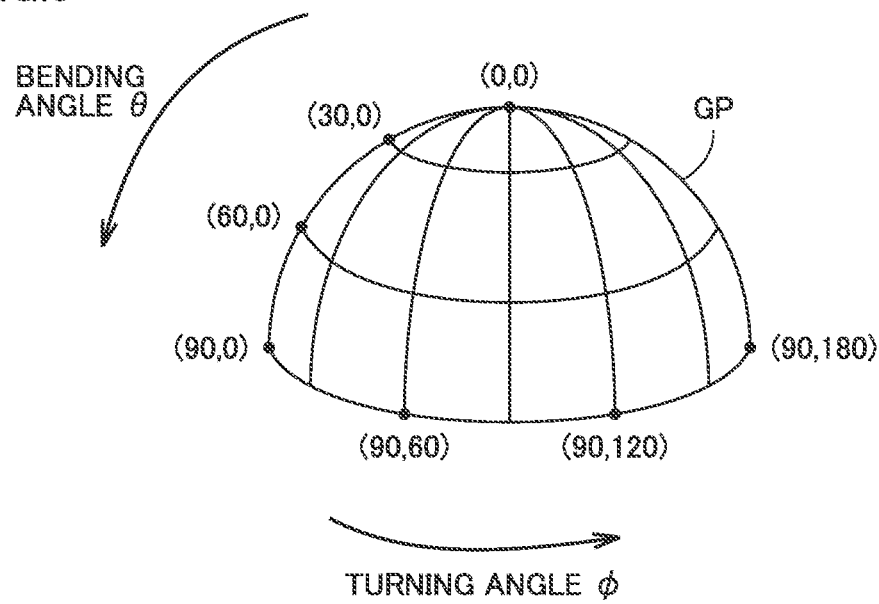
FIG. 9 is a diagram illustrating an operating space of the link actuation device.

FIG. 9 is a diagram illustrating an operating space of center PB of distal link hub 3 in link actuation device 50 including parallel link mechanism 1 as described above. When distal end coordinates (θ, φ) of center PB of distal link hub 3 are changed with proximal link hub 2 fixed as illustrated in FIG. 1, center PB moves on hemispherical surface GP having a position of the origin (0, 0) as a vertex.

Figure 10:
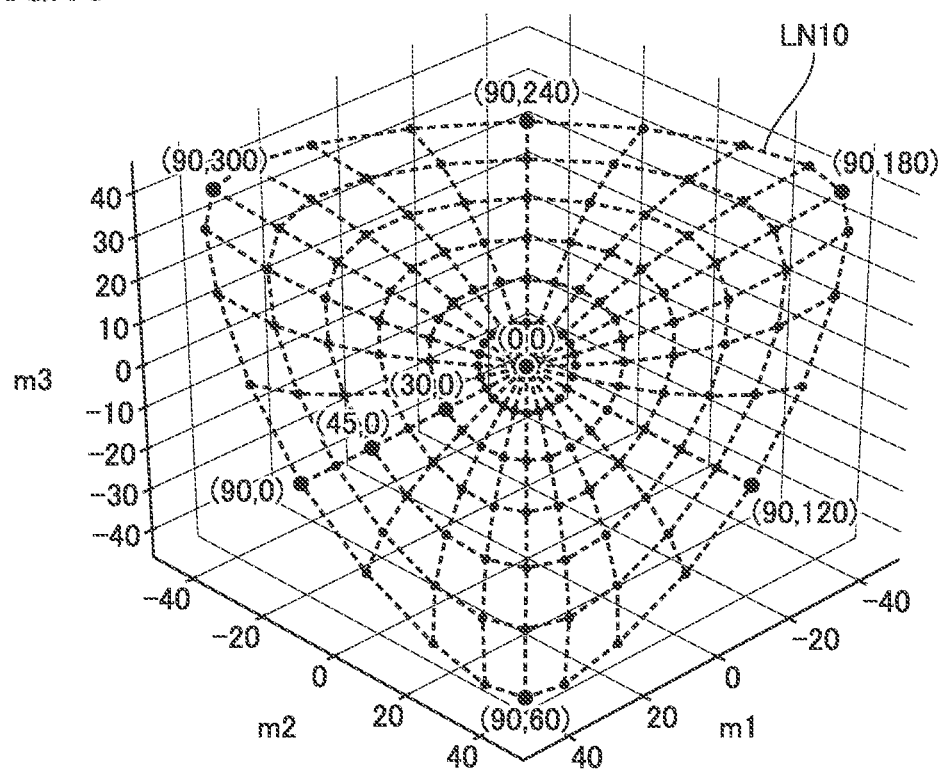
FIG. 10 is a diagram for describing a motor space defined by a motor command value for achieving the operating space illustrated in FIG. 9.

FIG. 10 is a diagram illustrating a motor space formed by motor command values for actuators 51 for achieving each position in the operating space illustrated in FIG. 9. Motor command values m1 to m3 for a motor provided in each of three link mechanisms 4 are illustrated on respective axes of FIG. 10. In FIG. 10, when a motor command value corresponding to each operation point in FIG. 9 is plotted, a three-dimensional curved surface as indicated by a dashed line LN 10 in FIG. 10 is obtained.

In general, in order to operate the link actuation device, actuator command values are calculated using an inverse kinematic function (for example, spherical trigonometry or the like) that geometrically obtains a rotation angle of each joint on the basis of a target position (θ, φ). However, since link actuation device 50 as described above has a configuration including a combination of a plurality of link mechanisms including a combination of members having a complicated shape, a positioning error may occur with respect to the target position on an actual machine basis due to an influence of a manufacturing error of each member, an assembly error of the link mechanism, and/or deflection or deformation of each member even if the motor is set at a geometrically obtained rotation angle. In order to improve absolute positioning accuracy of the link actuation device, it is necessary to correct such a positioning error. However, the manufacturing error, the assembly error, and the like are unique to each machine, so that it is difficult to correct the positioning error using a common inverse kinematic function for each machine.

As a method for coping with such a problem, a method for individually correcting a positioning error for each machine using a three-dimensional map of motor command values as illustrated in FIG. 10 as disclosed in Japanese Patent Laying-Open No. S60-205713 is known. It is, however, difficult for such a three-dimensional map to actually measure and express all positions on the operating space, so that the three-dimensional map is defined as a set of mesh-like discrete points as illustrated in FIG. 10. Therefore, in a case where a position that is not stored as the three-dimensional map is designated as the target position, there is a possibility that appropriate positioning correction cannot be performed.

On the other hand, when the number of measurement points for generating the three-dimensional map increases and a correction amount for a larger number of target positions is set, an enormous amount of time is required to set the correction amount and a large burden is imposed on an operator who makes adjustments.

Therefore, according to the present embodiment, a method is employed by which, in the three-dimensional map of motor command values as illustrated in FIG. 10, points on the map that are not actually measured are calculated from the mesh-like measurement points constituting the map by an interpolation formula using a polynomial curved surface formula, thereby to correct an error unique to each machine while suppressing an increase in the number of measurement points to improve the positioning accuracy. Note that, according to the present embodiment, an example in a case where a bicubic Bézier curved surface is used as the interpolation formula will be described, but the interpolation formula is not limited to the above example. A Ferguson formula, a Coons formula, a B-spline curved surface, a NURBS curved surface, or the like may be used as the interpolation formula. Two parameters may be of the first or higher degree, and may be different in degree from each other. Further, even in a case where the Bézier curved surface formula is used, the two parameters may be of the second or higher degree, and may be different in degree from each other.

(Interpolation Using Bézier Curved Surface Formula)

Figure 11:
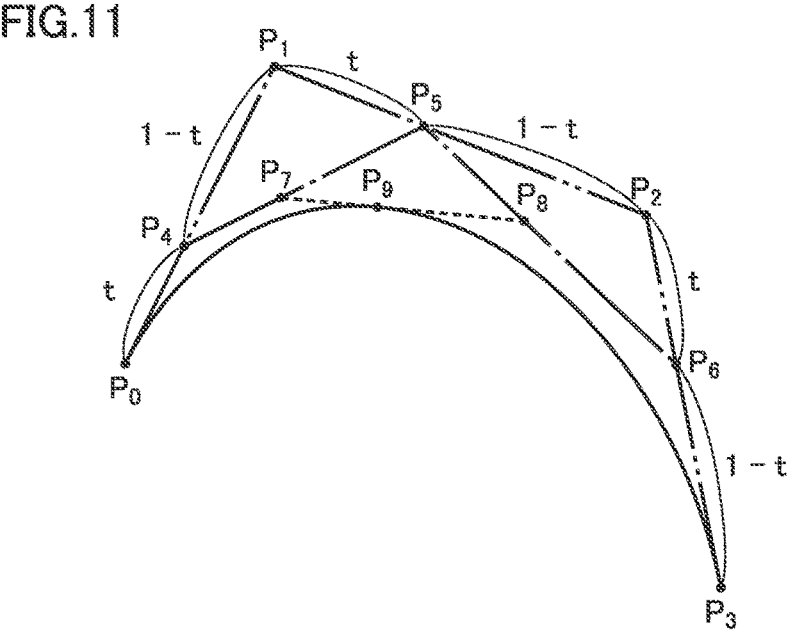
FIG. 11 is a diagram for describing a Bézier curve.

Next, an outline of the Bézier curved surface formula will be described. FIG. 11 is a diagram for describing how to draw a cubic Bézier curve on a plane. In FIG. 11, a case where a point $P_0$ and a point $P_3$ are connected by a Bézier curve will be described.

First, control points ($P_1$, $P_2$) different from points $P_0$, $P_3$ are set. Then, points dividing line segments $P_0$-$P_1$, $P_1$-$P_2$, $P_2$-$P_3$ internally into t: (1−t) are set as points $P_4$, $P_5$, $P_6$, respectively (here, 0≤t≤1). Furthermore, points dividing line segments $P_4$-$P_5$, $P_5$-$P_6$ internally into t: (1−t) are set as points $P_7$, $P_8$, respectively, and a point dividing a line segment $P_7$-$P_8$ internally into t: (1−t) is set as a point $P_9$. At this time, the locus of point $P_9$ when t is changed from 0 to 1 is a Bézier curve.

This relation can be expressed as the following formula (1):

[Math. 1]

$$S(t) = \sum_{i=0}^{3} P_i B_i^3(t) \quad (1)$$

$$B_i^n(t) = \binom{n}{i} t^i (1-t)^{n-i} (0 \le t \le 1)$$

where $B_i^n(t)$ denotes the Bernstein basis polynomials.

The above-described formula (1) extended to a curved surface using two variables is a Bézier curved surface, and can be expressed as the following formula (2):

[Math. 2]

$$S(u, v) = \sum_{i=0}^{3} \sum_{j=0}^{3} P_{ij} B_i^3(u) B_j^3(v) \quad (2)$$

$$B_i^n(u) = \binom{n}{i} u^i (i-u)^{n-i} (0 \le u \le 1)$$

$$B_j^n(v) = \binom{n}{j} v^j (i-v)^{n-j} (0 \le v \le 1)$$

Figure 12:
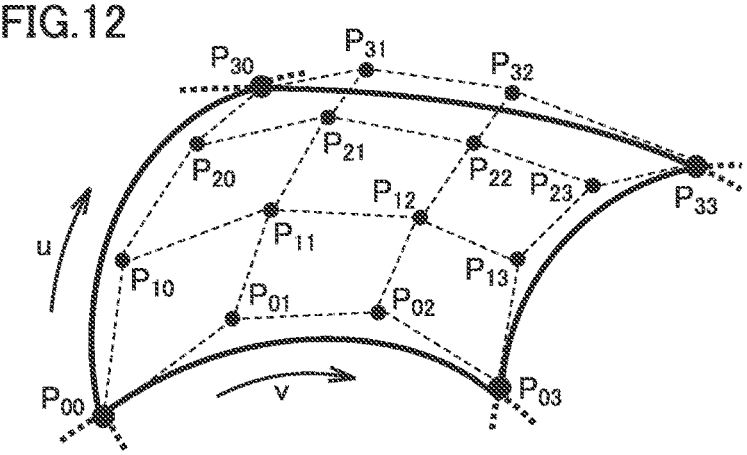
FIG. 12 is a diagram for describing a cubic Bézier curved surface used in the present disclosure.

FIG. 12 is a diagram for conceptually describing a cubic Bézier curved surface of the above-described formula (2), and a case where a curved surface in a region surrounded by four points $P_{00}$, $P_{03}$, $P_{30}$, $P_{33}$ (hereinafter, referred to as a "patch") is represented by a cubic Bézier curved surface will be considered. Here, the locus from point $P_{00}$ to point $P_{30}$ is a locus when a variable u is changed from 0 to 1 with a variable v fixed at point $P_{00}$. The locus from point $P_{00}$ to point $P_{03}$ is a locus when variable v is changed from 0 to 1 with variable u fixed at point $P_{00}$. Similarly, the locus from $P_{03}$ to $P_{33}$ is a locus when variable u is changed from 0 to 1 with variable v fixed at point $P_{03}$, and the locus from point $P_{30}$ to point $P_{33}$ is a locus when variable v is changed from 0 to 1 with variable u fixed at point $P_{30}$.

It is possible to express the curved surface of the patch surrounded by points $P_{00}$, $P_{03}$, $P_{30}$, $P_{33}$ by setting control points $P_{01}$, $P_{02}$, $P_{10}$-$P_{13}$, $P_{20}$-$P_{23}$, $P_{31}$, $P_{32}$ for four points $P_{00}$, $P_{03}$, $P_{30}$, $P_{33}$. It is possible to adjust the shape of the obtained curved surface by changing control points $P_{01}$, $P_{02}$, $P_{10}$-$P_{13}$, $P_{20}$-$P_{23}$, $P_{31}$, $P_{32}$.

In a case where the Bézier curved surface is applied to the three-dimensional map of motor command values illustrated in FIG. 10, for a patch surrounded by four points on the map obtained by actual measurement, the curved surface of the patch is expressed by setting the measurement points of the four corners as points $P_{00}$, $P_{03}$, $P_{30}$, $P_{33}$ and appropriately setting the remaining control points. Then, each motor command value can be obtained for the target position (θ, φ) in the patch by setting variable u as a parameter relating to bending angle θ and setting variable v as a parameter relating to turning angle φ.

That is, it is possible to interpolate points other than the measurement points in the three-dimensional map using the Bézier curved surface formula by adjusting and storing control points in advance for each machine. This makes it possible to reduce a positioning error for each machine with respect to the target position in each patch.

(Control Point Calculation Method)

In order to improve the positioning accuracy by interpolating the three-dimensional map of motor command values using the cubic Bézier curved surface formula, that is, in order to bring the Bézier curved surface close to a motion path of the actual machine, it is important how to set 12 control points that are unknown numbers other than the four corner points of the patch.

Figure 13:
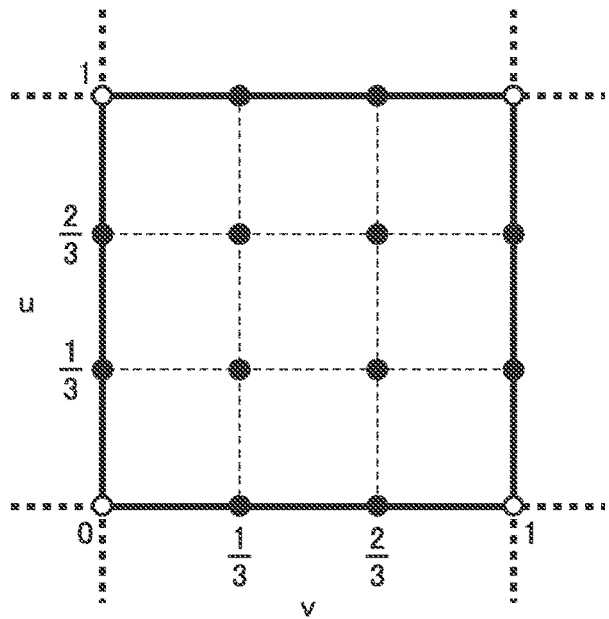
FIG. 13 is a first diagram for describing a method for calculating a control point.
Figure 14:
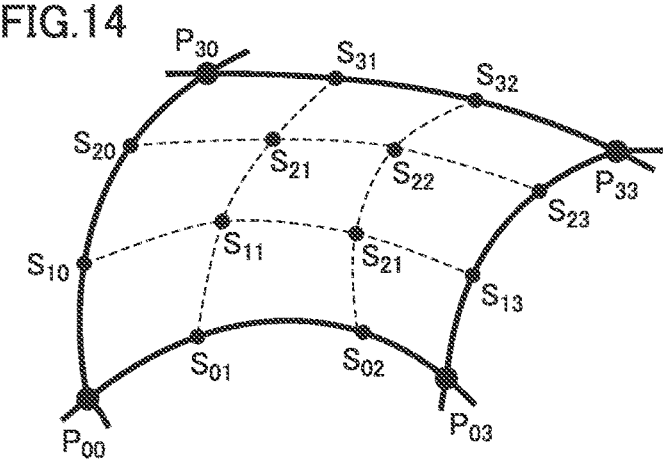
FIG. 14 is a second diagram for describing the method for calculating a control point.

FIGS. 13 and 14 are diagrams for describing a control point calculation method according to the present embodiment. According to the present embodiment, as illustrated in FIG. 13, in a patch defined by four points, positions of bending angle θ and turning angle φ corresponding to parameters u, v by which each surrounding line segment is divided into three equal parts are selected, and the motor command values are measured when the actual machine is moved to each selected position. Such positions are points that actually lie on the actual curved surface in the patch. These points are set as $S_{01}$, $S_{02}$, $S_{10}$-$S_{13}$, $S_{20}$-$S_{23}$, $S_{31}$, $S_{32}$ as illustrated in FIG. 14, and the motor command value at each position is substituted into the formula (2) to generate a simultaneous equation for 12 unknowns $P_{ij}$. By solving this simultaneous equation, it is possible to obtain 12 control points for achieving the Bézier curved surface that is a curved surface on which 16 points including the four corners of the patch are included. Note that FIG. 13 illustrates an example where the positions are selected at which each line segment of the periphery of the patch is divided into three equal parts, and motor command values are measured, but the positions to be selected are not necessarily the positions at which each line segment is divided into three equal parts and may be any 12 points in the patch.

Even in a case where a target position that does not coincide with a discrete actual measurement point in the three-dimensional map is set, by storing the control points calculated as described above in memory 102 in addition to the actual measurement points constituting the three-dimensional map illustrated in FIG. 10, it is possible to obtain a drive command value for each corresponding motor by interpolating the curved surface in the patch using the stored control points and the Bézier curved surface formula of the formula (2).

Note that points $S_{01}$, $S_{02}$, $S_{10}$-$S_{13}$, $S_{20}$-$S_{23}$, $S_{31}$, $S_{32}$ on the curved surface for calculating the control points may be set (measured) separately from the actual measurement points constituting the three-dimensional map, but the use of some of the actual measurement points constituting the three-dimensional map allows a reduction in time required for actually measuring the operation points.

[Description of Control Method]

Next, a method for controlling the actual machine will be described with reference to FIGS. 15 and 16.

(Preparation Process)

Figure 15:
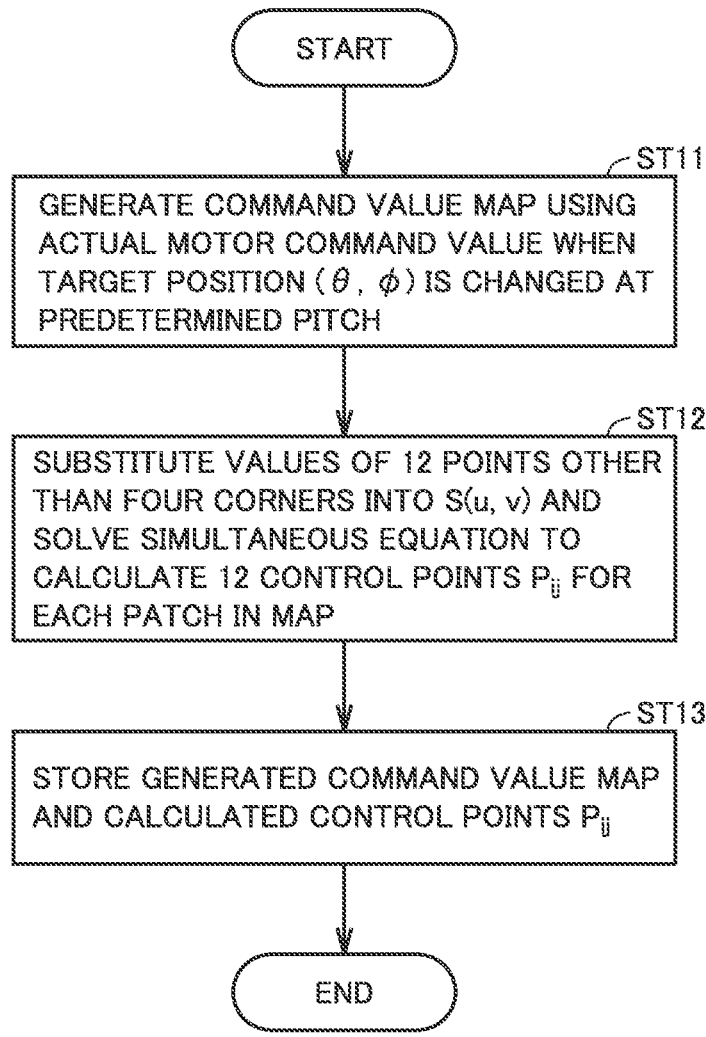
FIG. 15 is a flowchart for describing a method for generating a three-dimensional map.

FIG. 15 is a flowchart for describing a procedure of a preparation process of generating the three-dimensional map and calculating the control point.

With reference to FIG. 15, in step (hereinafter, a step is abbreviated as "ST") 11, actual motor command values for actuators 51 when the target position (θ, φ) is changed at a predetermined pitch are stored, and a three-dimensional map as illustrated in FIG. 10 is generated.

At this time, for the measurement at each target position, in a space where link actuation device 50 is placed, an absolute position of center point PB of distal link hub 3 is detected using a sensor provided outside the device, and a motor command value when center point PB reaches the target position is stored. As the sensor provided outside, a tilt angle sensor, 3D vision, or the like is used.

Next, in ST12, 12 points on the curved surface other than four corners are set as illustrated in FIG. 13 for each patch in the map obtained in ST11, and the motor command value when operated at the absolute position of each point is substituted into the Bézier curved surface formula of the formula (2). Then, 12 control points $P_{ij}$ for the target patch are calculated by solving a simultaneous equation including the obtained 12 equations.

In ST13, the generated three-dimensional map (command value map) and the calculated control points are stored in memory 102.

Note that, for the control points, a value obtained by the above-described calculation may be used as it is. However, test operation may be actually performed a plurality of times using the calculated control point, and a control point corrected on the basis of the absolute position obtained by the test operation may be used.

Further, the method for generating the map of motor command values when the actual machine is placed at the absolute target position has been described above, but, alternatively, an error between the motor command value when the actual machine is placed at the absolute target position and the motor command value theoretically derived using the inverse kinematics function is calculated, and a correction value map for correcting the error may be generated. Even in a case where the correction value map is used, the control point is calculated in the same manner as described above.

(Actual Machine Control Process)

Figure 16:
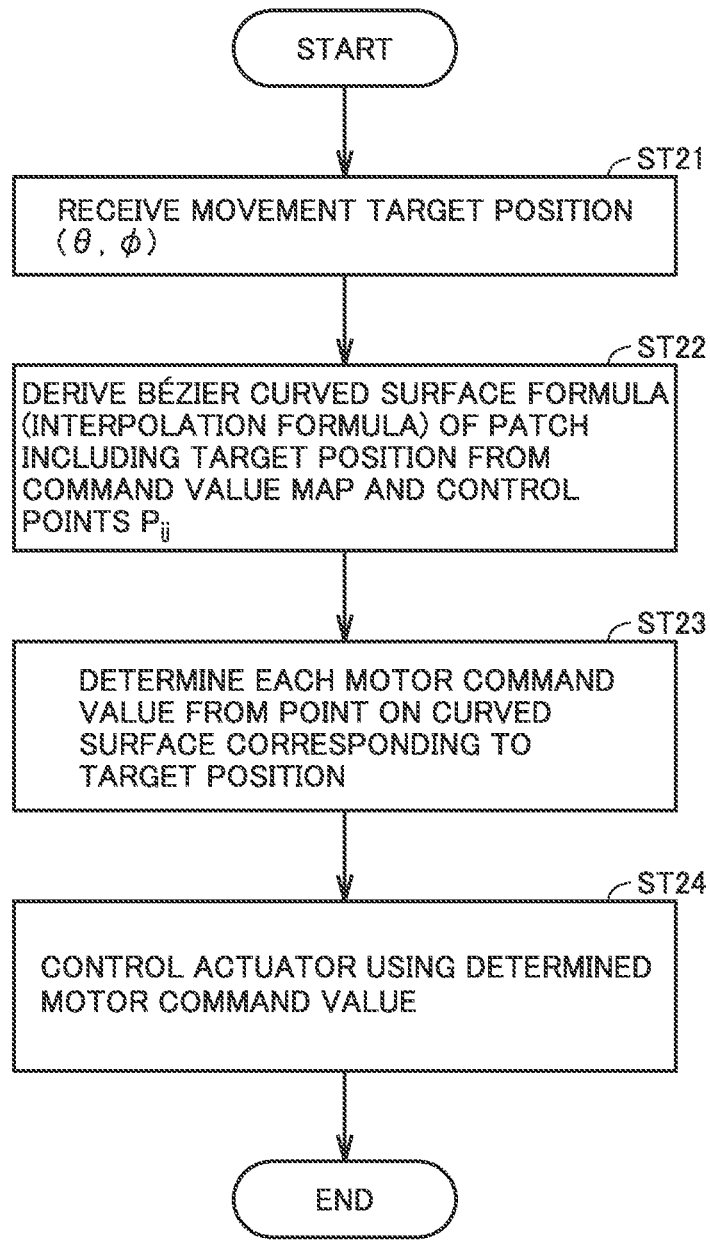
FIG. 16 is a flowchart for describing a control method for operating an actual machine.

FIG. 16 is a flowchart for describing a control method in a case where the actual machine is put into operation in accordance with the target command value using the three-dimensional map and the control points set as described above. The process of FIG. 16 is performed by CPU 101 of control device 100.

With reference to FIG. 16, in ST21, control device 100 receives a movement target position (θ, φ) via a setting from a user or a command from a host system. Then, in ST22, control device 100 sets a patch including the target position using the command value map set in the preparation process of FIG. 15, and derives a Bézier curved surface formula (interpolation formula) using the control points for the patch. In ST23, control device 100 determines each motor command value from a point corresponding to the target position in the derived interpolation formula. Then, control device 100 positions link actuation device 50 at the target position by controlling the actuator using the determined motor command value in ST24.

As described above, in the link actuation device including the parallel link mechanism, a motor command value for an unmeasured position on the map is interpolated and determined using the Bézier curved surface formula using the motor command value map and the control points generated in advance in the preparation process, thereby allowing an improvement in the positioning accuracy of the link actuation device. Further, the amount of data required for positioning correction can be reduced by using the interpolation formula, so that it is possible to suppress an increase in memory capacity in the control device.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A link actuation device comprising:
a first link hub adjacent to a proximal end;
a second link hub adjacent to a distal end;
at least three link mechanisms that couple the first link hub and the second link hub;

a drive device that drives the at least three link mechanisms; and
a control device that controls the drive device, wherein
the drive device includes motors provided for the at least three link mechanisms, respectively,
each of the at least three link mechanisms includes
a first end link member rotatably coupled to the first link hub,
a second end link member rotatably coupled to the second link hub, and
a center link member rotatably coupled to both the first end link member and the second end link member,
in the at least three link mechanisms,
at least three center axes of revolute pairs of the first link hub and the first end link members and a center axis of a revolute pair of one end of each of the center link members intersect at a first link hub center point, and
at least three center axes of revolute pairs of the second link hub and the second end link members and a center axis of a revolute pair of an other end of each of the center link members intersect at a second link hub center point,
the control device stores a map in which drive command values for each of the motors corresponding to a plurality of discrete positions within a movable range of the second link hub are stored, and
upon receipt of a command value for movement to a position that coincides with none of the plurality of positions within the movable range, the control device determines a drive command value for each of the motors by interpolating a region surrounded by four points at the plurality of positions on the map using a polynomial curved surface formula.

2. The link actuation device according to claim 1, wherein
each of the plurality of positions is defined by an angle θ formed by a normal line passing through the first link hub center point and a normal line passing through the second link hub center point, and a rotation angle φ of the second link hub center point around the normal line passing through the first link hub center point, and
the polynomial curved surface formula is a cubic Bézier curved surface formula expressed by a relational formula described below:

[Math. 1]

$$S(u, v) = \sum_{i=0}^{3}\sum_{j=0}^{3} P_{ij} B_i^3(u) B_j^3(v)$$

$$B_i^n(u) = \binom{n}{i} u^i (i-u)^{n-i} (0 \le u \le 1)$$

$$B_i^n(v) = \binom{n}{i} v^i (i-v)^{n-i} (0 \le v \le 1)$$

$B_i^3(u)$, $B_j^3(v)$: Bernstein basis polynomials,
$P_{ij}$: control point,
u: parameter corresponding to the angle θ, and
v: parameter corresponding to the rotation angle φ.

3. A method for driving a link actuation device,
the link actuation device including
a first link hub adjacent to a proximal end,
a second link hub adjacent to a distal end,
at least three link mechanisms that couple the first link hub and the second link hub, and
a drive device that drives the at least three link mechanisms, the drive device including motors provided for the at least three link mechanisms, respectively,
each of the at least three link mechanisms including
a first end link member rotatably coupled to the first link hub,
a second end link member rotatably coupled to the second link hub, and
a center link member rotatably coupled to both the first end link member and the second end link member, and
in the at least three link mechanisms,
at least three center axes of revolute pairs of the first link hub and the first end link members and a center axis of a revolute pair of one end of each of the center link members intersecting at a first link hub center point, and
at least three center axes of revolute pairs of the second link hub and the second end link members and a center axis of a revolute pair of an other end of each of the center link members intersecting at a second link hub center point,
the method comprising:
generating and storing a map in which drive command values for each of the motors corresponding to a plurality of discrete positions within a movable range of the second link hub are stored;
receiving a target movement position of the second link hub;
interpolating a region surrounded by four points at the plurality of positions on the map using a polynomial curved surface formula in a case where the target movement position coincides with none of the plurality of positions within the movable range;
determining a drive command value for each of the motors using the map subjected to the interpolation; and
driving each of the motors using the command value determined for each of the motors.

4. The method according to claim 3, wherein
each of the plurality of positions is defined by an angle θ formed by a normal line passing through the first link hub center point and a normal line passing through the second link hub center point, and a rotation angle φ of the second link hub center point around the normal line passing through the first link hub center point, and
the polynomial curved surface formula is a cubic Bézier curved surface formula expressed by a relational formula described below:

[Math. 2]

$$S(u, v) = \sum_{i=0}^{3}\sum_{j=0}^{3} P_{ij} B_i^3(u) B_j^3(v)$$

$$B_i^n(u) = \binom{n}{i} u^i (i-u)^{n-i} (0 \le u \le 1)$$

$$B_i^n(v) = \binom{n}{i} v^i (i-v)^{n-i} (0 \le v \le 1)$$

$B_i^3(u)$, $B_j^3(v)$: Bernstein basis polynomials,
$P_{ij}$: control point,
u: parameter corresponding to the angle θ, and
v: parameter corresponding to the rotation angle φ.

* * * * *